(12) United States Patent
Emig et al.

(10) Patent No.: US 8,790,761 B2
(45) Date of Patent: *Jul. 29, 2014

(54) PIPES COMPRISING β-NUCLEATED PROPYLENE COPOLYMERS

(75) Inventors: Juergen Emig, Wiez (AT); Karl Ebner, Rohr/Kremstal (AT); Franz Ruemer, St. Georgen/Gusen (AT)

(73) Assignee: Borealis Technology OY, Porvoo (FI)

( * ) Notice: Subject to any disclaimer, the term of this patent is extended or adjusted under 35 U.S.C. 154(b) by 968 days.

This patent is subject to a terminal disclaimer.

(21) Appl. No.: 12/594,406

(22) PCT Filed: Apr. 10, 2008

(86) PCT No.: PCT/EP2008/002846
§ 371 (c)(1),
(2), (4) Date: Feb. 20, 2010

(87) PCT Pub. No.: WO2008/122445
PCT Pub. Date: Oct. 16, 2008

(65) Prior Publication Data
US 2010/0151172 A1    Jun. 17, 2010

(30) Foreign Application Priority Data
Apr. 10, 2007 (EP) .................................... 07007348

(51) Int. Cl.
*C08F 210/06* (2006.01)
*C08F 210/08* (2006.01)

(52) U.S. Cl.
CPC ............. *C08F 210/06* (2013.01); *C08F 210/08* (2013.01); *C08F 2500/12* (2013.01); *C08F 2500/11* (2013.01)
USPC ....................................... 428/35.7; 428/36.91

(58) Field of Classification Search
CPC .. C08F 210/06; C08F 210/08; C08F 2500/12; C08F 2500/11; C08F 4/6543; C08K 5/0083; C08L 23/10
USPC ............................................ 428/35.7, 36.91
See application file for complete search history.

(56) References Cited

U.S. PATENT DOCUMENTS

2005/0053741 A1    3/2005  Ebner et al.

FOREIGN PATENT DOCUMENTS

| EP | 1 344 793 A1 | 9/2003 |
|----|--------------|--------|
| EP | 1 382 638 A1 | 1/2004 |
| WO | WO 03/042260 A1 | 5/2003 |

OTHER PUBLICATIONS

Kotek, Jiri et al. "The Effect of Specific β-Nucleation on Morphology and Mechanical Behavior of Isotactic Polypropylene", *Journal of Applied Polymer Science*, 85:1174-1184, 2002.

*Primary Examiner* — Michele L Jacobson
(74) *Attorney, Agent, or Firm* — Seed IP Law Group PLLC

(57) ABSTRACT

The present invention concerns a propylene copolymer composition, a molded article comprising the composition and the use of the propylene copolymer composition for preparing molded articles, preferably pipes.

12 Claims, 1 Drawing Sheet

PIPES COMPRISING β-NUCLEATED PROPYLENE COPOLYMERS

The present invention concerns a propylene copolymer composition, a molded article comprising the composition and the use of the propylene copolymer composition for preparing molded articles, preferably pipes.

BRIEF DESCRIPTION OF THE RELATED ART

Polymer materials are frequently used for pipes for various purposes such as fluid transport, i.e. transfer of liquids or gases, such as water or natural gas. The fluid may be transported under normal pressure or may be pressurized. Such transported fluids may have varying temperatures, typically within a temperature range of from 0° C. to 70° C. Such pipes are preferably made of polyolefins, usually polyethylene or polypropylene.

In particular, if hot water is to be transported or if pressurized fluids are to be transported, polymer materials such as polyolefins are often considered as not satisfactory for pipe applications. For fluids as identified above, pipes must withstand the strain associated with high temperature and/or high pressure. In hot water applications, temperatures in the range from 30 to 70° C. often occur, with peak temperatures as high as 100° C. Similar problems also occur with pressurized fluids, wherein the pipes must withstand the internal pressure in order to provide a satisfactory stability.

According to the draft standard PREN12202, a hot water polypropylene pipe must meet the requirement of at least 1000 hours before failure at 95° C. and 3.5 MPa pressure, in particular if the pipe is prepared from a random copolymer.

In the art, various approaches have been disclosed in order to provide pipes prepared from polyolefinic materials satisfying at least partially the needs as outlined above.

The Austrian patent AT 404294 B as well as the international patent application WO 99/40151 disclose pressure pipes comprising an extruded polypropylene pipe body. In order to achieve high resistance to accelerated cracking, the polypropylene employed for providing the pipe body is a polypropylene predominantly crystallized in the hexagonal β-form, which is achieved by using an amide based nucleating agent. The polypropylenes as identified in the abovementioned prior art publications are propylene homopolymers, compounded with various amides as β-nucleating agent. While the pipes as disclosed in these prior art documents already provide some improvements with respect to long term stability, further improvements are still desired in view of the ever increasing demands with respect to long term use and safety of pipes prepared from polyolefinic materials.

The international patent application WO 99/24479 discloses nucleated propylene polymers which have been nucleated with a polymeric nucleating agent containing vinyl compound units. These propylene polymers may be employed for the preparation of extrusion formed bodies or molded articles, including pipes and fittings. The polymeric nucleating agent as employed in accordance with the disclosure of WO 99/24479, however, addresses the need of replacing low molecular weight nucleating agents such as sorbitol based nucleating agents or benzoate based nucleating agents. These nucleating agents, however, are traditional α-nucleating agents and also the polymeric vinyl containing nucleating agent as disclosed in WO 99/24479 is an α-nucleating agent. While α-nucleated propylene polymers provide satisfactory properties for several applications, they nevertheless do not fulfill the more stringent requirements for hot water pipes or pipes employed for the transportation of pressurized fluids.

The international patent application WO 03/042260 finally discloses pressure pipes prepared from a polypropylene composition at least partially crystallized in the β-modification, wherein the polypropylene may comprise $C_4$-$C_8$ α-olefins and/or ethylene. The propylene copolymers disclosed in this international patent application contain, however, rather high amounts of comonomers, such as exemplified by polymers with more than 8 wt % butene and, in embodiments, the propylene copolymers disclosed in WO 03/042260 are terpolymers comprising two different types of comonomers, in addition to propylene. The pressure pipes disclosed in WO 03/042260 are described as providing long term pressure resistance, so that the pressure pipes disclosed in WO 03/042260 are in particular used in applications requiring the transportation of pressurized fluids. However, due to the ever increasing demands on the long term stability and safety of articles prepared from polyolefinic materials, in particular propylene polymers, further improvements are required in particular with respect to long term stability.

OBJECT UNDERLYING THE PRESENT INVENTION

Accordingly, it is the object of the present invention to provide a propylene polymer composition enabling the preparation of molded articles, in particular pipes, which provide a superior long term stability, compared with the pipes as disclosed in the prior art.

BRIEF DISCLOSURE OF THE PRESENT INVENTION

The present invention solves the above object by providing a propylene copolymer composition as defined herein. Preferred embodiments are disclosed in the claims as well as the following specification. The present invention furthermore provides a molded article in accordance with the definition as provided herein. Preferred embodiments are disclosed in the claims as well as the following specification. The present invention finally provides the use as defined herein. Preferred embodiments are defined in the claims as well as the following specification.

DETAILED DESCRIPTION OF THE PRESENT INVENTION

Figure 1:
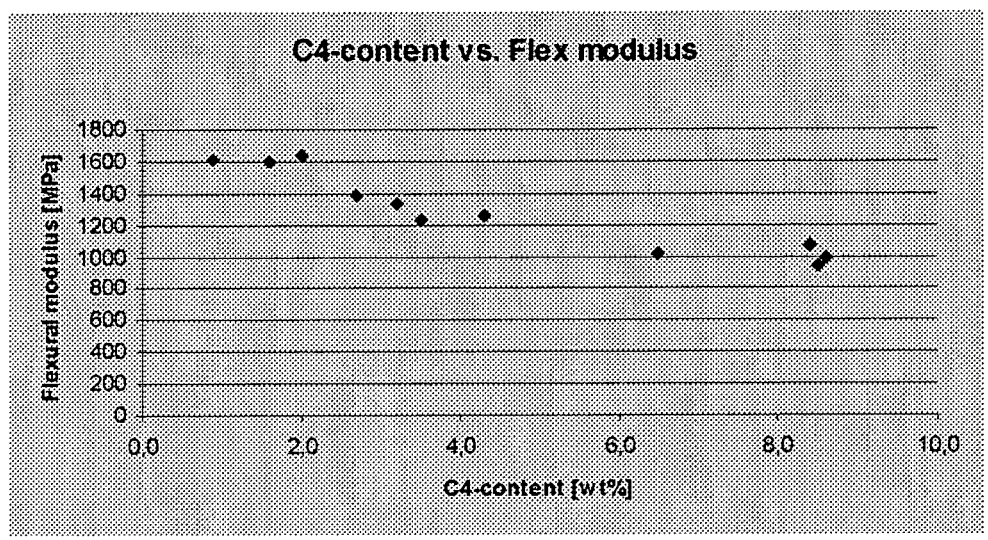
FIG. 1 displays a correlation of the results of the flexural modulus versus the comonomer content for butene containing propylene copolymers in accordance with the present invention.

As identified in claim 1, the propylene copolymer composition in accordance with the present invention comprises from 94 to 99 wt % of propylene and from 1 to 6 wt % of a comonomer selected from α-olefins with 4 to 8 carbon atoms, wherein the propylene copolymer is at least partially crystallized in the β-modification.

The wording with respect to the propylene copolymer of the present invention as employed herein is intended to define that the propylene copolymer is a copolymer of propylene and the named comonomers, meaning that further comonomers are absent. Accordingly the propylene copolymer of the present invention can be regarded as consisting of the components as defined in claim 1 and the subclaims as well as the following description. The propylene copolymer of the present invention furthermore is not a heterophasic propylene copolymer.

Suitable comonomers are in particular α-olefins with 4 or 6 carbon atoms, with α-olefins with 4 carbon atoms being in particular preferred. The most preferred embodiment with respect to the type of comonomer is a propylene copolymer comprising as comonomer 1-butene.

The propylene copolymers in accordance with the present invention preferably comprise only one type of comonomer, i.e. the propylene copolymer is a binary copolymer and preferably not a terpolymer. The propylene copolymer preferably consists of the above-identified amount of propylene and the above-identified amount of one comonomer; preferably the propylene copolymer consists of from 94 to 99 wt % of propylene and from 1 to 6 wt % of 1-butene.

The amount of comonomer amounts to 1 to 6 wt %, preferably to 2 to 6 wt % and more preferably 2 to 5 wt %, in particular 2.2 to 4.5 wt %, more preferably 2.5 to 4.5 wt %.

The propylene copolymer in accordance with the present invention preferably is a random copolymer, wherein the units derived from the comonomer are distributed statistically throughout the polymer and it is in particular preferred when the comonomer distribution is independent of the molecular weight fraction etc.

As identified in claim 1, the propylene copolymer is at least partially crystallized in the β-modification. Preferably, the amount of β-crystallinity of the propylene copolymer is at least 50%, more preferably at least 60%, more preferably at least 70%, and most preferably at least 80%.

β-modification for a propylene copolymer may be achieved by adding a β-nucleating agent, which may be selected among any of the known β-nucleating agents. Typical examples of β-nucleating agents are defined in claim 10. Other β-nucleating agents are, however, not excluded and the present invention envisages the use of any β-nucleating agent, which may be defined as an agent which is suitable for inducing crystallization of polypropylene copolymers in the hexagonal or pseudo hexagonal modification, including mixtures of such nucleating agents. Further suitable types of β-nucleating agents are as follows:

Suitable types of β-nucleating agents are
dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, e.g.
N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide,
N,N'-di-$C_5$-$C_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide,
N,N'-di-$C_5$-$C_8$-cycloalkyl-terephthalamide compounds such as N,N'-dicyclohexylterephthalamide and N,N'-dicyclopentylterephthalamide,
N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide,
diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.
N,N'-$C_6$-$C_{12}$-arylene-bis-benzamide compounds such as N,N'-p-phenylene-bis-benzamide and N,N'-1,5-naphthalene-bis-benzamide,
N,N'-$C_5$-$C_8$-cycloalkyl-bis-benzamide compounds such as N,N'-1,4-cyclopentane-bis-benzamide and N,N'-1,4-cyclohexane-bis-benzamide,
N,N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and
N,N'-$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide,
amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.
N-phenyl-5-(N-benzoylamino)pentaneamide and N-cyclohexyl-4-(N-cyclohexyl-carbonylamino)benzamide.

Further suitable β-nucleating agents are
quinacridone type compounds, e.g. quinacridone, dimethylquinacridone and dimethoxyquinacridone,
quinacridonequinone type compounds, e.g. quinacridonequinone, a mixed crystal of 5,12-dihydro(2,3b)acridine-7,14-dione with quino(2,3b)acridine-6,7,13,14-(5H,12H)-tetrone and dimethoxyquinacridonequinone and
dihydroquinacridone type compounds, e.g. dihydroquinacridone, dimethoxydihydroquinacridone and dibenzodihydroquinacridone.

Still further suitable β-nucleating agents are
dicarboxylic acid salts of metals from group IIa of periodic system, e.g. pimelic acid calcium salt and suberic acid calcium salt; and
mixtures of dicarboxylic acids and salts of metals from group IIa of periodic system.

Still further suitable β-nucleating agents are
salts of metals from group IIa of periodic system and imido acids of the formula

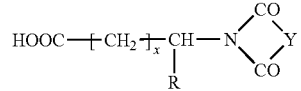

wherein x=1 to 4; R=H, —COON, $C_1$-$C_{12}$-alkyl, $C_5$-$C_8$-cycloalkyl or $C_6$-$C_{12}$-aryl, and
Y=$C_1$-$C_{12}$-alkyl, $C_5$-$C_8$-cycloalkyl or $C_6$-$C_{12}$-aryl-substituted bivalent $C_6$-$C_{12}$-aromatic residues, e.g.
calcium salts of phthaloylglycine, hexahydrophthaloylglycine, N-phthaloylalanine and/or N-4-methylphthaloylglycine.

Preferred β-nucleating agents are any one or mixtures of N,N'-dicyclohexyl-2,6-naphtalene dicarboxamide, the β-nucleating agents of EP 170889 and those of EP 682066.

Such β-nucleating agents may be employed in amounts of from 0.0001 to 2.0 wt %, preferably 0.001 to 1 wt %, more preferably 0.003 to 0.3 wt % and most preferably 0.003 to 0.25 wt %, based on the weight of the propylene copolymer used. Preferred β-nucleating agents selected from quinacridone pigments illustrated above preferably are used in amounts of 0.001 to 0.01 wt %, such as 0.005 wt %, while other preferred β-nucleating agents selected among the Group II metal salts of dibasic carboxylic acids, such as pimelic acid calcium salt and suberic acid calcium salt are preferably employed in amounts of 0.1 to 0.3 wt %, such as 0.2 wt %. The addition of a β-nucleating agent may be carried out by melt mixing the propylene copolymer with the β-nucleating agent, typically at temperatures of from 175 to 250° C. in suitable devices, such as an extruder, followed by cooling and crystallizing the melt according to procedures which are known to the skilled person.

The propylene copolymer in accordance with the present invention may be monomodal with respect to the molecular weight distribution ($M_w/M_n$) or comonomer composition or the propylene copolymer may be multimodal, in particular bimodal with respect to the molecular weight distribution and/or comonomer content. Preferred, however, are monomodal propylene copolymers.

The propylene copolymer composition in accordance with the present invention typically has an MFR of from 0.05 to 10 g/10 min at 230° C./2.16 kg. Depending on the desired end use, the MFR may be in the range of from 0.1 to 5 (unit as above) and in embodiments the present invention contemplates MFR values of from 0.1 to 0.5, in particular for use in pipe applications or MFR values of from 2 to 3 for the preparation of articles prepared by molding operations.

The propylene copolymer in accordance with the present invention may be prepared using conventional catalysts, including Ziegler-Natta catalysts and single site catalysts (including metallocenes), which may be supported catalysts. Typical Ziegler-Natta catalysts are disclosed in the above-cited international patent application WO 03/042260 as well as WO 99/24479, incorporated herein by reference with respect to the description of catalyst components and polymerization conditions.

The propylene copolymer composition in accordance with the present invention provides highly satisfactory properties for the preparation of pipes and other molded articles, for example couplers and articles required for pipe connections. The propylene copolymer compositions in accordance with the present invention typically provide values for flexural modulus of above 800 MPa, typically of about 1000 MPa, such as 1200 to 1400 MPa. The propylene copolymer composition in accordance with the present invention in particular enable the preparation of pipes having highly satisfactory values for crack growth of above 700 hours, preferably above 800 hours, more preferably above 900 hours and in embodiments even above 1000 hours, such as from 800 to 1400 hours, or from 800 to 1300 hours as measured by FNCTNM5.

In accordance therewith, the present invention further provides molded articles prepared using the propylene copolymer composition as defined herein. Preferably, the molded article is selected among pipes, couplers and other articles required for pipe connections. Pipes as prepared from the propylene copolymer composition in accordance with the present invention may be employed for various purposes, in particular pipes in accordance with the present invention may be employed as hot water pipes for household applications and as pipes used for industrial purposes, such as for transporting hot and/or pressurized fluids as well as non-pressurized fluids.

Due to the improved physical properties of the propylene copolymer composition, the pipes in accordance with the present invention provide an improved long-term use without sacrificing stability and/or safety. Pipes in accordance with the present invention may be prepared with different diameters and different wall thicknesses, depending on the desired end use. The pipes in accordance with the present invention may be pipes having a monolayer wall prepared using the propylene copolymer composition in accordance with the present invention or the pipes in accordance with the present invention may be multilayer pipes wherein at least one of the layers comprises the propylene copolymer composition in accordance with the present invention. The other layers of such multilayer pipes may be selected as desired for the respective end use.

Due to the improved physical properties of the propylene copolymer composition in accordance with the present invention, the pipes in accordance with the present invention may have smaller wall thicknesses and/or larger diameters, compared with pipes prepared from conventional prior art materials without sacrificing the physical properties. This enables, without reducing the long-term stability, to reduce the weight of a given pipe.

Due to the possibility of providing pipes with smaller wall thicknesses (without sacrificing, as outlined above, the physical properties), the present invention also ensures a faster and more energy efficient connecting of different pipe segments since less energy (typically heat) is required for the necessary softening/widening of pipe ends in order to achieve the desired connection. The same principal considerations also apply with respect to pipe couplers/connectors etc. as described herein.

Furthermore, as already outlined elsewhere, the pipes in accordance with the present invention provide an improved resistance to stress cracking, which can be evaluated, for example, by monitoring the point at which ductile failure changes to brittle failure. Materials in accordance with the present invention show a later occurrence of non-ductile failure or brittle failure compared with prior art materials.

In this furthermore has to be emphasized that, in particular, the improvement with respect to resistance to stress cracking and the later occurrence of brittle failure has to be considered as being surprising since, in particular, the addition of higher α-olefins, such as butene, conventionally would be considered as increasing brittleness of a given material. However, this is surprisingly not the case for the composition in accordance with the present invention which shows an improvement in particular with respect to the resistance against brittle failure.

Accordingly, the pipes in accordance with the present invention show improved long-term pressure resistance as well as a further improvement with respect to the occurrence of brittle failure. The preferred embodiments as defined above for the propylene copolymer composition in accordance with the present invention also apply with respect to the molded articles as described herein.

Molded articles as defined herein, in particular pipes, may be prepared in accordance with standard techniques known to the skilled person. Typical processes involve the plasticizing or melting of the propylene polymer composition in an extruder, typically temperatures in the range of from 200 to 250° C., followed by extruding through an annular die and cooling. Other molded articles, such as fitting and couplers, may be produced using conventional molding techniques such as extrusion molding, injection molding etc., depending from the respective article to be manufactured.

Definitions and Test Methods

Long-term pressure resistance herein means a late occurrence of knee-point when the pipe is tested according to EN ISO 1167-1:2006 (E). Test samples are treated according to EN ISO 1167-2:2006 (E). Late means that the occurrence of knee-point is shifted to a considerably higher failure time as for conventional polypropylene pipes. A late occurrence of a knee-point also usually encompasses that the slope of a regression line connecting the ductile failure points in a log-log diagram is flatter than compared with the prior art. The pipes used for testing have a diameter (measured from the outsides of the pipe) of 32 mm with a wall thickness of 3 mm. Pipes are produced by extrusion with an extruder having an inlet temperature of about 80° C., a temperature profile within the extruder of from about 180° C. to about 210° C. with a die temperature of about 220° C. Extruded pipes were cooled in a water bath of 20° C. after extrusion. Output during extrusion was about 62 kg/h with an average pipe weight of 255 g/m and a line speed of 4 m/min.

Description of ductile failure, brittle failure and knee-point (at a given temperature):

A ductile failure is defined as a macroscopically visible deformation of the pipe geometry, e.g. a ruptured bubble. A brittle failure or a weeping failure, which both are in the following referred to as non-ductile (ND) is defined as a failure which does not result in a visible deformation of the pipe geometry, e.g. cracks, fissures. A weeping failure typically has such a small crack that it needs to be visually inspected to see water penetrating out of the pipe wall. Brittle failures are detected by pressure loss in the pipe pressuring equipment. A knee-point at a given temperature is defined as the intersection of the regression line representing the ductile failures and the regression line representing the non-ductile failures.

In order to calculate the lifetime of a pipe at longer times, pipes need to be pressure tested at different temperatures according to ISO 1167. Pressure test results at higher temperatures, e.g. at 110° C. or 95° C., allow to extrapolate the lifetime of the pipe to lower temperatures. The extrapolation procedure is described in detail in the ISO TR9080 (1992) standard, commonly referred as the standard extrapolation method (SEM). This calculation method, which was defined for plastics pipes, fits a regression line in all the ductile breaks for a given test temperature and a second regression line in the non-ductile breaks of this given temperature. The non-ductile lines are always steeper than the ductile lines. The calculation method is based on the combination of the set of failure data, where at a given temperature pipes are tested at different stress levels to get different failure times. Also pipes which are still "in progress", i.e. no pipe failure has been observed and the time under test at a given time and stress is known, may also be added to the set of data. This is particularly valid for pipes still under test at longer test times. Extrapolation time limits are also defined in this standard, e.g. when test results are available at 95° C. up to one year, these test results are allowed to be extrapolated to 55° C. (i.e. 95 minus 40) at 50 years. 50 years of extrapolation are relevant for building pipes, but also shorter times such as 10 to 20 years of extrapolation are relevant, e.g. for pipes for industrial use. The slopes of the lines of the non-ductile failures are steeper (i.e. more negative) than that of the ductile failures. Since the point where the knee-point occurs, greatly influences the extrapolated stress at a given temperature, typically chosen between 30 to 70° C., with extrapolated lifetimes from 10 to 50 years, it is desirable for the knee-point to be at long times. The achievement of the invention is that the knee-point at a given temperature of the new product is shifted to longer times compared to present art.

It is also possible, when testing a pipe at a higher temperature such as 95° C., that a knee-point is not observed within an investigation time of 1 year, which is in fact a particularly preferred behaviour. In such a case it is possible to use only ductile failures for extrapolation of longer times.

The slope of the regression line of the ductile failure points has a large influence on the extrapolated life times. It is therefore desirable for this slope for a given temperature to be as large as possible, i.e. the regression line shall be as "flat" as possible. It is part of the present invention that the extrapolation line linking the ductile failure points for a given temperature is flatter than in the prior art.

It has surprisingly been found that pressure pipes, which are comprised of the above composition in accordance with the present invention, exhibit a remarkably improved behaviour where long-term pressure resistance is concerned.

Long-term stability as defined herein in particular refers to a resistance against crack growth, which is determined in accordance with the test method FNCTNM5. The results as reported herein concerning FNCTNM5 are results obtained according to ISO16770 as carried out by Hessel Ingenieurtechnik, Am Vennstein 1a, 52159 Roetgen, Germany.

This test is carried out with test samples prepared by pressing sheets of the material with a dimension of 300×300×10 mm, followed by milling actual test samples having dimensions of 110×10×10 mm. The original test sheet is prepared at a pressing temperature of 200 to 220° C., with a holding time (melt time) of 10 minutes, followed by pressing for 45 minutes with a three-step profile (25/50/75 bar) for 15 minutes each, followed by cooling with a cooling rate of 15° C./min and a taking out of the sample at a temperature of 40° C. During cooling the final pressure is maintained. Prior to milling, the actual test samples and testing the molded sheet is stored at ambient temperature for at least 96 hours.

Definition of Pipe:

The term "pipe" as used herein is meant to encompass hollow articles having a length greater than the diameter.

Definition of couplers and articles required for pipe connections:

The terms "couplers" and "articles required for pipe connections" refer to supplementary parts like fittings, valves and all parts which are commonly necessary for piping systems.

The above-defined pipes, couplers and articles required for pipe connections may contain in addition to the propylene copolymer composition as defined in herein usual auxiliary materials, such as fillers, stabilizers, processing aids, antistatic agents, pigments and reinforcing agents. In this respect, it has to be noted, however, that any of such of auxiliary materials which serve as highly active $\alpha$-nucleating agents, such as certain pigments, are not utilized in accordance with the present invention.

Typical amounts of any of the auxiliary materials as mentioned above are up to 40 wt % for fillers, 0.01 to 2.5 wt % for stabilizers, 0.01 to 1 wt % of processing aids, 0.1 to 1 wt % of antistatic agents, 0.2 to 3 wt % pigments and 0.2 to 3 wt % reinforcing agents, such as glass fibers.

Determination of $\beta$-crystallinity

The $\beta$-crystallinity was determined by Differential Scanning Calorimetry (DSC). DSC was run according to ISO 3146/part 3/method C2 with a scan rate of 10° C./min. The amount of $\beta$-modification was calculated from the second heat by the following formula:

$$\beta\text{-area}/(\alpha\text{-area}+\beta\text{-area})$$

Since the thermodynamical instable $\beta$-modification starts to be changed into the more stable $\alpha$-modification at temperatures above 150° C., a part of the $\beta$-modification is transferred within the heating process of DSC-measurement. Therefore the amount of $\beta$-PP determined by DSC is lower as when measured according to the method of Turner-Jones by WAXS (A. Turner-Jones et. al., Makromol. Chem 75 (1964) 134).

"Second heat" means, that the sample is heated according to ISO 3146/part 3/method C2 for a first time and then cooled to room temperature at a rate of 20° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. Using the second heat for determination of β-crystallinity, it is possible to compare samples regardless of the way the samples were originally manufactured.

MFR

The melt flow rates were measured with a load of 2.16 kg at 230° C. The melt flow rate is that quantity of polymer in grams which the test apparatus standardized to ISO 1133 extrudes within 10 minutes at a temperature of 230° C. under a weight of 2.16 kg.

Flexural Modulus

The flexural modulus was determined according to the method of ISO 178 by using injection molded test specimens as described in EN ISO 1873-2 (80×10×4 mm).

EXAMPLES

Propylene-butylene copolymers were polymerized using a commercially available Ziegler-Natta catalyst (Titaniumtetrachloride catalyst supported on $MgCl_2$) suitable for the production of polypropylene copolymers in a monomer suspension.

Polymerization was performed continuously in a prepolymerization reactor and a main polymerization reactor. Temperatures, pressures, catalyst-, monomer- and hydrogen feed in the polymerization steps as well as polymer concentration in the main reactor were kept constant. The concentration of hydrogen in the mixture of liquid monomers was continuously monitored by gas chromatography. The relevant processing parameters are listed below:

The first polymerization step was performed in a small reactor equipped with a stirrer and a cooling system, where an excess of a liquid mixture of the monomers propylene and 1-butene was prepolymerized for 9 minutes at 20° C. Catalyst component as well as cocatalyst triethyl aluminum (TEAL) and cyclohexyl methyl dimethoxysilane (CMDMS) were continuously poured into the prepolymerization unit. The prepolymer was continuously removed from the prepolymerization unit and transferred to the main polymerization reactor, equipped with a stirrer and a cooling system. Under an excess of the monomers propylene and 1-butene the final copolymer was formed. A continuous stream of monomers and hydrogen for molecular mass control was fed into the reactor. The polymer was removed in order to keep the polymer concentration constant and the removed copolymer was degassed and dried.

Catalyst system: TEAL/CMDMS (g/g) 4.85; TEAL/Ti (mol/mol) 91

Prepolymerization: Pressure 34 bar; Temperature 20° C.; Mean residence time 9 minutes;

Catalyst feed 4.04 g/h

Main reactor: Pressure 34 bar; Temperature 65° C.; Polymer concentration 520 g/l;

Monomer feed 130 kg/h, Hydrogen concentration based on monomer feed 95 ppm

Figure 2:
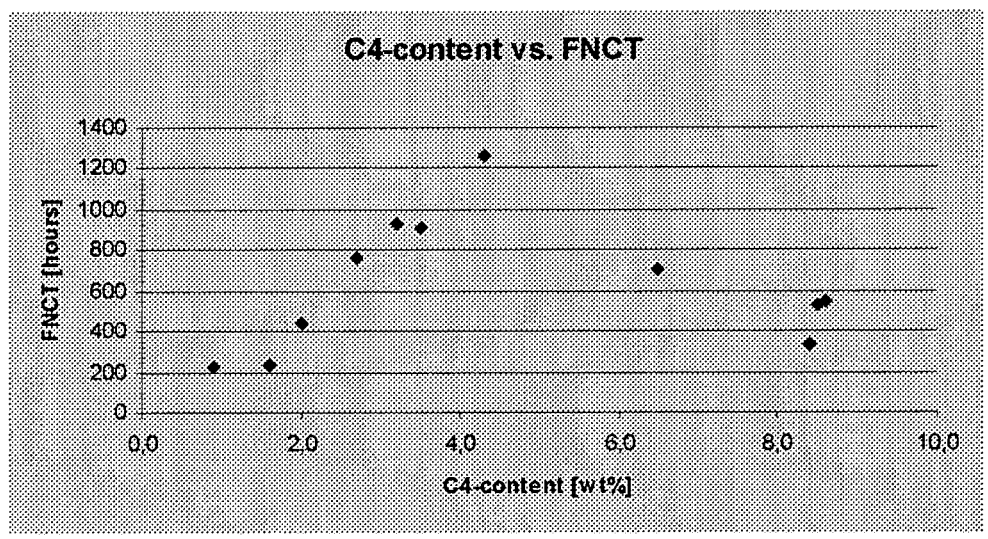
FIG. 2 displays a correlation of the results of the full notch creep test FNCT versus the comonomer content for butene containing propylene copolymers in accordance with the present invention.

The 1-butene content in the monomer feed was adjusted to obtain 1-butene contents in the final copolymers as derivable from table 1. The results for flexural modulus and FNCT are also shown in table 1. These results also depicted in FIGS. 1 and 2 show the surprising finding of the present invention. While the flexural modulus shows a gradual decrease with increasing amounts of comonomer, the FNCT value, corresponding to important pipe properties, i.e. crack growth, surprisingly shows a maximum within the comonomer content range claimed in the present invention. From the values of the flexural modulus, a common characterization of polymeric compositions, no skilled person could envisage such a surprising performance maximum within the comonomer range as now claimed from the important pipe property as represented by the FNCT value. Form the values of the flexural modulus no skilled person could estimate that such a performance maximum is present. This achievement of the present invention has to be considered as completely surprising and unexpected.

TABLE 1

| C4 [wt %] | flex modulus [MPa] | FNCT [hours] |
| --- | --- | --- |
| 0.9 | 1617 | 230 |
| 2 | 1631 | 437 |
| 2.7 | 1384 | 767 |
| 3.2 | 1336 | 931 |
| 3.5 | 1239 | 912 |
| 4.3 | 1255 | 1261 |
| 6.5 | 1019 | 725 |
| 8.4 | 1076 | 333 |
| 8.5 | 939 | 527 |
| 8.6 | 998 | 545 |

The copolymers obtained were compounded in a conventional manner with the following additives in order to prepare compounds with which the mechanical evaluation was carried out.

0.07 wt % calcium stearate 0.25 wt % pentaerythritol-tetrakis(3,5-di-tert.-butyl-4-hydroxyphenyl)propionate 0.1 wt % tris(2,4-di-tert.-butylphenyl)phosphate 0.25 wt % 3,3',3',5,5',5'-hexa-tert.-butyl-a,a',a'-(mesitylene-2,4,6-triyl)tri-p-cresol 50 ppm Chinquasia gold (quinacridone pigment orange 48)

The invention claimed is:

1. A propylene copolymer, wherein the propylene copolymer comprises from 94 to 99 wt. % of propylene and from 2.5 to 4.5 wt. % of a 1-butene comonomer, and wherein the propylene copolymer is at least partially crystallized in a beta-modification.

2. The propylene copolymer of claim 1, wherein the propylene copolymer is a random copolymer.

3. The propylene copolymer of any one of claims 1 or 2, wherein the amount of the propylene copolymer crystallized in the beta-modification is at least 50%, as determined by DSC using second heat.

4. The propylene copolymer of claim 1, wherein the propylene copolymer has a flexural modulus of from about 1100 to about 1400 MPa.

5. The propylene copolymer of claim 1, wherein the 1-butene comonomer is the only comonomer present in the propylene copolymer.

6. The propylene copolymer of claim 1, further comprising a beta-nucleating agent.

7. The propylene copolymer of claim 6, wherein the beta-nucleating agent is selected from the group consisting of N,N'-dicyclohexyl-2,6-naphthalene dicarboxamide, 5,12-dihydro-quino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

8. The propylene copolymer of claim 1, wherein the propylene copolymer has a crack growth of from about 800 to about 1400 hours, as measured by FNCTNM5.

9. A molded article comprising the propylene copolymer of claim 1.

10. The molded article of claim 9, wherein the molded article is selected from pipes, couplers and articles required for pipe connections.

11. A method for preparing molded articles, the method comprising providing the propylene copolymer of claim 1 and molding the propylene copolymer into a molded article.

12. The method of claim 11, wherein the molded article is selected from pipes, couplers and articles required for pipe connections.

* * * * *